T. W. CARTER.
BLOW-OUT PROTECTOR FOR TIRES.
APPLICATION FILED OCT. 30, 1916.
1,224,103.
Patented Apr. 24, 1917.
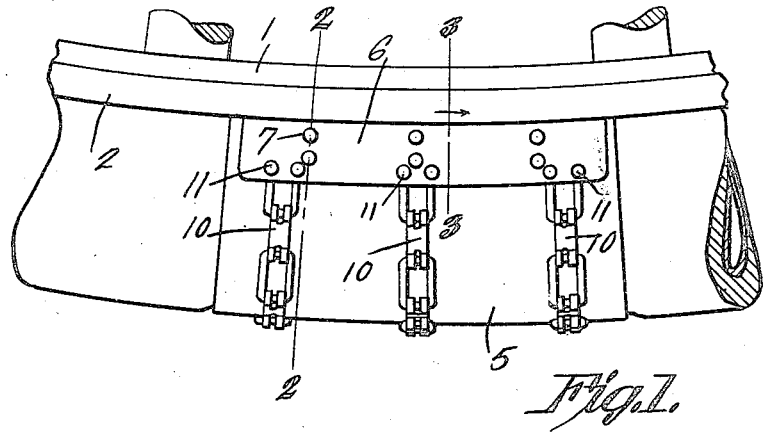
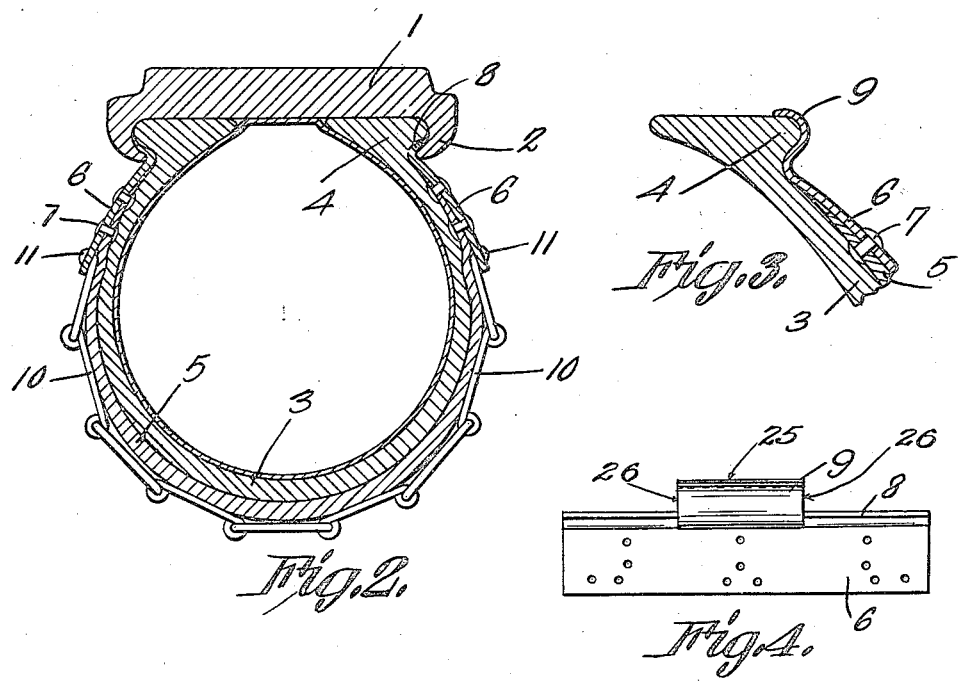
Witnesses
Theodore W. Carter,
Inventor
by
Attorneys

UNITED STATES PATENT OFFICE.

THEODORE W. CARTER, OF SILVER CITY, NEW MEXICO, ASSIGNOR OF ONE-HALF TO MOSES R. BUCHANAN, OF SILVER CITY, NEW MEXICO.

BLOW-OUT PROTECTOR FOR TIRES.

1,224,103. Specification of Letters Patent. Patented Apr. 24, 1917.

Application filed October 30, 1916. Serial No. 128,527.

*To all whom it may concern:*

Be it known that I, THEODORE W. CARTER, a citizen of the United States, residing at Silver City, in the county of Grant and State of New Mexico, have invented a new and useful Blow-Out Protector for Tires, of which the following is a specification.

This invention aims to provide novel means for holding in place adjacent blow outs or weak places in the tire casing, a protector of novel construction.

In the drawings:—

Figure 1 shows in side elevation, a portion of a tire and a rim whereunto the device forming the subject matter of this application has been applied;

Fig. 2 is a cross section on the line 2—2 of Fig. 1;

Fig. 3 is a fragmental cross section taken approximately on the line 3—3 of Fig. 1, distant parts being omitted;

Fig. 4 is a side elevation of one of the attaching plates.

In the drawings, the numeral 1 denotes a rim having clencher flanges 2 or other suitable means adapted to retain a tire casing 3 which may have clencher beads 4 engaging the clencher flanges 2.

The device forming the subject matter of this application includes a flexible casing 5 preferably made of leather, but, in any event, impervious to air, water, dirt, or other foreign substance. Side plates 6 are riveted at 7 to the longitudinal edges of the body 5. Each side plate 6 is provided at its ends with first tongues 8 which extend outwardly for engagement beneath the clencher flange 2 of the rim, each plate being provided intermediate its ends with a second tongue 9 which extends inwardly for engagement between the base of the tire and the base of the rim, the second tongue 9 projecting as shown at 25 beyond the first tongues 8, whereby the bead of the tire may engage the side edges 26 of the second tongue 9, thereby to aid in holding each plate against longitudinal movement. Flexible elements 10 extend transversely of the body 5 and the ends of the flexible elements are secured as shown at 11 to the side plates 6. The flexible elements 10 may be chains, or they may be otherwise constructed as occasion demands.

The structure shown in Fig. 1 of the drawings may be duplicated any desired number of times around the casing 3, wherever there are weak places, or punctures therein. The flexible elements 10 give strength to the device, and the body 5 prevents the flexible elements from cutting into the casing 3.

It will be understood that the tongues 9 may be curved to fit a rim of any kind, whether of the clencher type, straight side, quick detachable or otherwise.

When the structure is mounted in place on the tire, the chains 10 indent themselves in the flexible casing 5 and exclude all dirt, water or foreign substances from the weakened places in the shoe or tire-carcass 3 to which the device is applied. The structure, further, affords a protection against blowing-out. The structure, therefore, exercises two functions, in that it prevents a weak spot in the tire casing from blowing out and, further, maintains such a weak place free from grit, gravel, muddy water and the like which would tend to weaken the defective spot still further, and cause its early rupture.

Having thus described the invention, what is claimed is:—

In a device of the class described, a pair of side plates and a flexible tire-inclosing body connecting the side plates, each side plate being provided at its ends with first tongues which extend outwardly for engagement beneath the clencher flanges of a rim, each plate being provided intermediate its ends with a second tongue which extends inwardly for engagement between the base of a tire and the base of a rim, the second tongue projecting beyond the first tongues, whereby the bead of a tire may engage the side edges of the second tongue, thereby to aid in holding the side plate against longitudinal movement.

In testimony that I claim the foregoing as my own, I have hereto affixed my signature in the presence of two witnesses.

THEODORE W. CARTER.

Witnesses:
 CARL D. COMSTOCK,
 EARL T. WILEY.